(12) United States Patent
Tomescu

(10) Patent No.: US 11,415,591 B2
(45) Date of Patent: Aug. 16, 2022

(54) PITCH CONTROL ASSEMBLY FOR AN AIRCRAFT-BLADED ROTOR

(71) Applicant: PRATT & WHITNEY CANADA CORP., Longueuil (CA)

(72) Inventor: Dana Tomescu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 153 days.

(21) Appl. No.: 16/684,531

(22) Filed: Nov. 14, 2019

(65) Prior Publication Data

US 2021/0071539 A1 Mar. 11, 2021

Related U.S. Application Data

(60) Provisional application No. 62/896,157, filed on Sep. 5, 2019, provisional application No. 62/896,163, filed on Sep. 5, 2019.

(51) Int. Cl.
*F01D 21/00* (2006.01)
*G01D 5/14* (2006.01)
(Continued)

(52) U.S. Cl.
CPC ............ *G01P 3/488* (2013.01); *B64C 11/301* (2013.01); *B64D 27/10* (2013.01); *F01D 7/00* (2013.01); *F01D 17/02* (2013.01); *F01D 17/06* (2013.01); *F01D 17/20* (2013.01); *F01D 21/003* (2013.01); *F04D 29/362* (2013.01); *G01D 5/145* (2013.01); *B63H 2003/006* (2013.01);
(Continued)

(58) Field of Classification Search
CPC .......... F01D 7/00; F01D 17/20; F01D 21/003; F01D 17/02; F05D 2260/70; F05D 2270/80; F05D 2300/507; B64C 11/06; B64C 11/301; F05B 2270/328; F02C 9/28; F04D 29/362
See application file for complete search history.

(56) References Cited

U.S. PATENT DOCUMENTS

| 10,280,771 B2 * | 5/2019 | Drozdenko ............ F01D 21/045 |
| 2005/0161304 A1 | 7/2005 | Brandl et al. |

(Continued)

FOREIGN PATENT DOCUMENTS

WO 2010083007 7/2010

*Primary Examiner* — Courtney D Heinle
*Assistant Examiner* — Andrew J Marien
(74) *Attorney, Agent, or Firm* — Norton Rose Fulbright Canada LLP

(57) ABSTRACT

A feedback device for use in a gas turbine engine, and methods and systems for controlling a pitch for an aircraft-bladed rotor, are provided. The feedback device is composed of a circular disk and a plurality of position markers. The circular disk is coupled to rotate with a rotor of the gas turbine engine, to move along a longitudinal axis of the rotor, and has first and second opposing faces defining a root surface that extends between and circumscribes the first and second faces. The plurality of position markers extend radially from the root surface and are circumferentially spaced around the circular disk. The position markers have a top surface elevated with respect to the root surface and opposing first and second side surfaces. The side surfaces of the position markers have a curved concave profile extending toward the root surface.

20 Claims, 8 Drawing Sheets

(51) Int. Cl.
  *G01P 3/488* (2006.01)
  *B64C 11/30* (2006.01)
  *B64D 27/10* (2006.01)
  *F01D 7/00* (2006.01)
  *F01D 17/20* (2006.01)
  *F01D 17/06* (2006.01)
  *F01D 17/02* (2006.01)
  *F04D 29/36* (2006.01)
  *F02C 7/32* (2006.01)
  *B63H 3/00* (2006.01)
  *B64C 11/06* (2006.01)
  *F02D 41/28* (2006.01)

(52) U.S. Cl.
  CPC .............. *B64C 11/06* (2013.01); *F02C 7/32* (2013.01); *F02D 2041/281* (2013.01); *F02D 2041/288* (2013.01); *F05B 2270/328* (2013.01); *F05D 2220/323* (2013.01); *F05D 2260/70* (2013.01); *F05D 2270/02* (2013.01); *F05D 2270/80* (2013.01); *F05D 2270/821* (2013.01); *F05D 2300/507* (2013.01)

(56) References Cited

U.S. PATENT DOCUMENTS

| | | |
|---|---|---|
| 2013/0038319 A1 | 2/2013 | Gayney et al. |
| 2017/0248085 A1* | 8/2017 | Carrington .............. B64C 11/30 |
| 2018/0050789 A1 | 2/2018 | Marone et al. |
| 2018/0230846 A1* | 8/2018 | Kawano ................... F01D 17/06 |
| 2018/0306053 A1* | 10/2018 | Chapman ................ B64C 11/06 |
| 2018/0320601 A1* | 11/2018 | Snyder .................... F02C 7/232 |
| 2018/0330874 A1* | 11/2018 | Tuor ........................ G01P 1/026 |
| 2019/0348203 A1* | 11/2019 | Hirakawa ................. H01F 1/37 |
| 2020/0149480 A1* | 5/2020 | Bacic ..................... F16F 15/002 |

\* cited by examiner

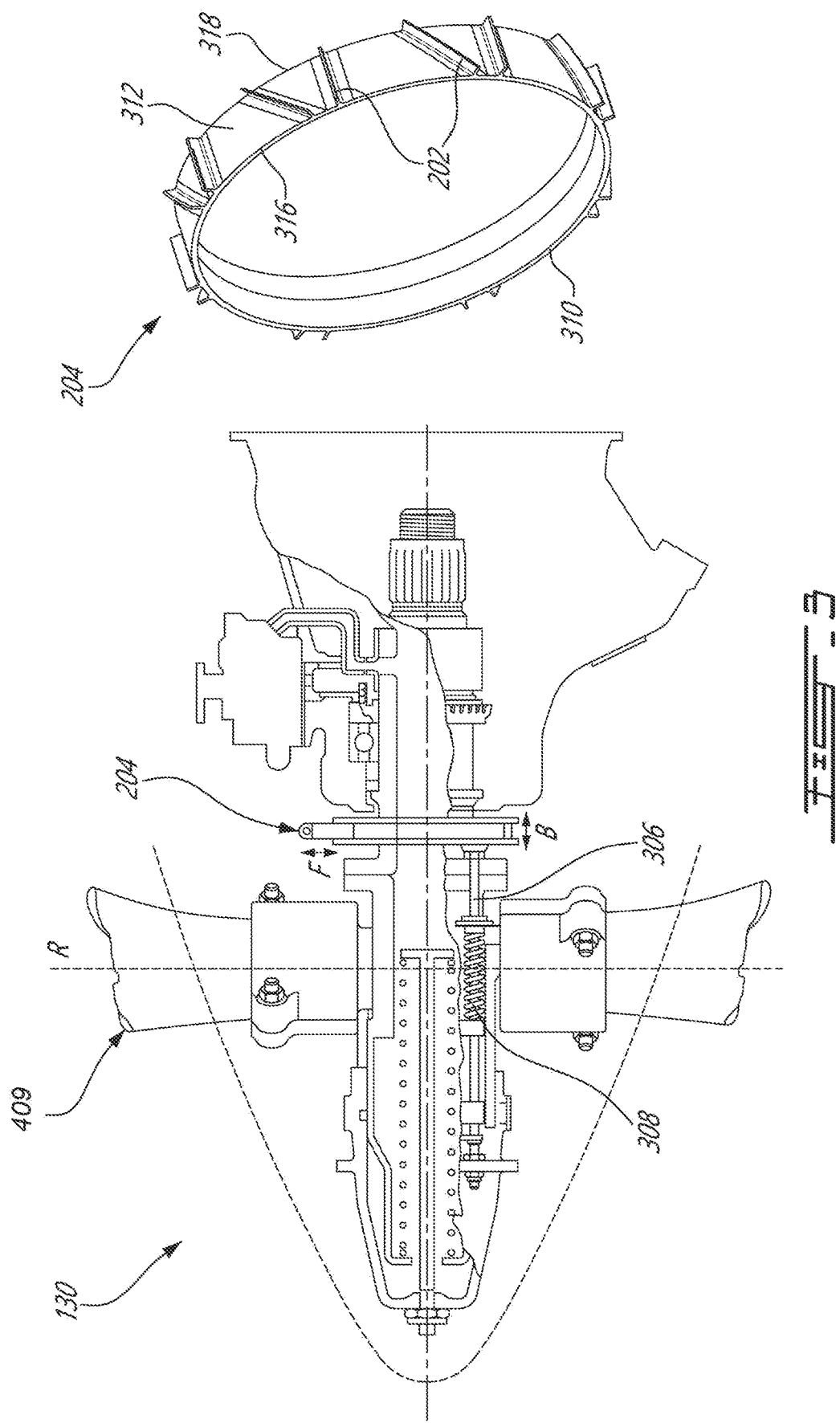

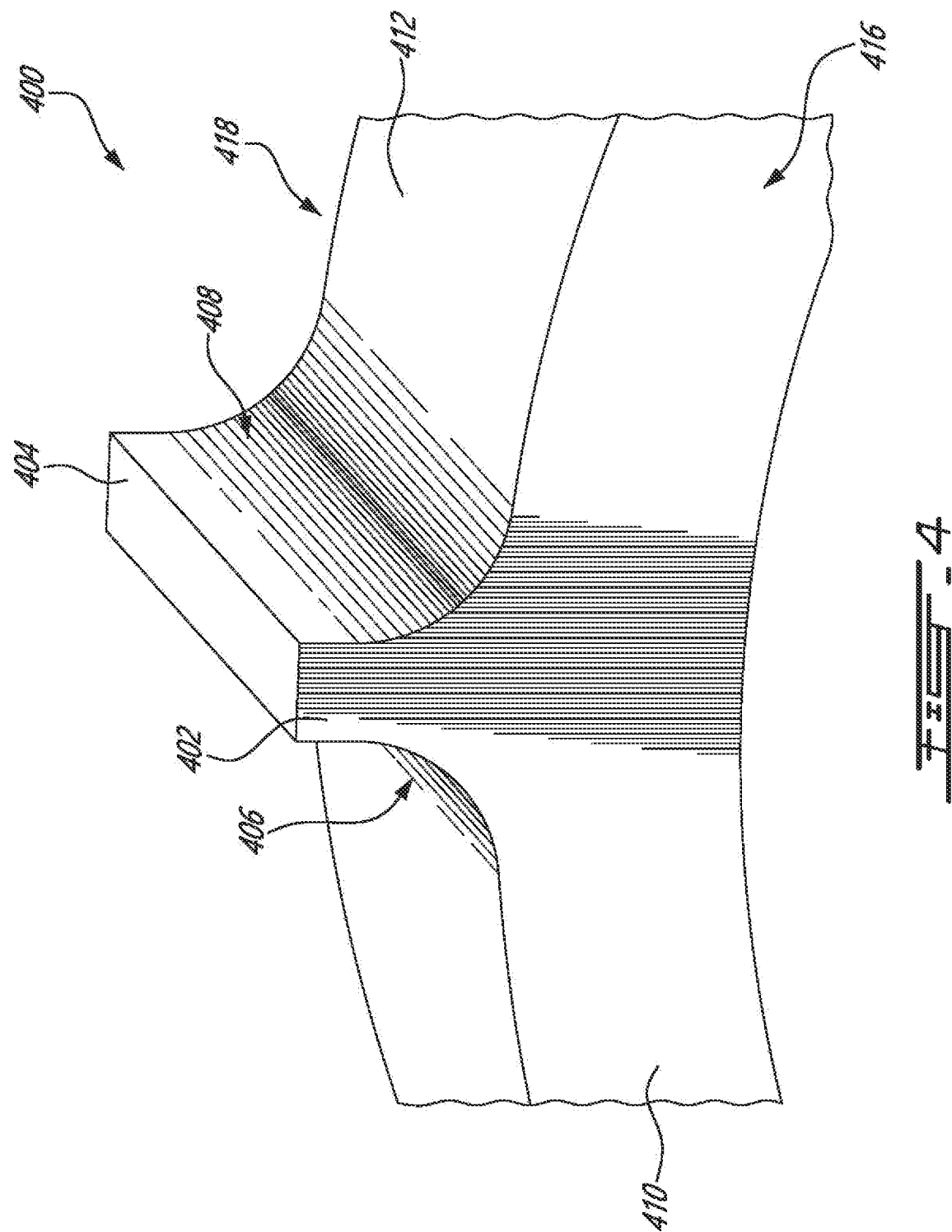

PITCH CONTROL ASSEMBLY FOR AN AIRCRAFT-BLADED ROTOR

CROSS-REFERENCE TO RELATED APPLICATIONS

This patent application claims the benefit of U.S. Provisional Patent Application 62/896,157, filed Sep. 5, 2019, and of U.S. Provisional Patent Application 62/896,163, filed Sep. 5, 2019.

TECHNICAL FIELD

The present disclosure relates generally to aircraft engines, and more specifically to pitch control systems for aircraft engines.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine.

The feedback device has multiple readable markers disposed on an outer surface thereof, and a sensor can be used to measure the rotation of the feedback device via the markers, providing a proxy value for the rotational speed of the engine, as well as measure blade angle. Existing feedback devices are however vulnerable to a so-called "edge-effect" that leads to an increase in reading error as the sensor approaches the edges of the feedback device.

Therefore, improvements are needed.

SUMMARY

In accordance with a broad aspect, there is provided a feedback device for use in a gas turbine engine, and methods and systems for controlling a pitch for an aircraft-bladed rotor, are provided. The feedback device is composed of a circular disk and a plurality of position markers. The circular disk is coupled to rotate with a rotor of the gas turbine engine, to move along a longitudinal axis of the rotor, and has first and second opposing faces defining a root surface that extends between and circumscribes the first and second faces. The plurality of position markers extend radially from the root surface and are circumferentially spaced around the circular disk. The position markers have a top surface elevated with respect to the root surface and opposing first and second side surfaces. The side surfaces of the position markers have a curved concave profile extending toward the root surface.

In accordance with another broad aspect, there is provided a method for controlling a pitch for an aircraft-bladed rotor, comprising: obtaining a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers extending radially from a root surface of a circular disk composing the feedback device, the root surface extending between and circumscribing first and second opposing faces of the circular disk, the position markers spaced circumferentially around the feedback device and having a top surface elevated with respect to the root surface and opposing first and second curved concave side surfaces; processing the plurality of sensor signals to identify passage of the plurality of position markers of the feedback device; and generating, based on the processed sensor signals, a feedback signal indicative of the blade pitch angle.

In accordance with a further broad aspect, there is provided a system for controlling a pitch for an aircraft-bladed rotor. The system comprises a processing unit, and a non-transitory computer-readable memory communicatively coupled to the processing unit. The non-transitory computer-readable medium comprises computer-readable program instructions executable by the processing unit for: obtaining a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers extending radially from a root surface of a circular disk composing the feedback device, the root surface extending between and circumscribing first and second opposing faces of the circular disk, the position markers spaced circumferentially around the feedback device, having a top surface elevated with respect to the root surface, and having opposing first and second curved concave side surfaces extending toward the root surface; processing the plurality of sensor signals to identify passage of the plurality of position markers of the feedback device; and generating, based on the processed sensor signals, a feedback signal indicative of the blade pitch angle.

Features of the systems, devices, and methods described herein may be used in various combinations, in accordance with the embodiments described herein.

BRIEF DESCRIPTION OF THE DRAWINGS

Reference is now made to the accompanying figures in which:

FIG. 3 is a schematic diagram of the propeller of FIG. 1 with the pitch control system of FIG. 2, in accordance with at least one embodiment;

FIG. 4 is a perspective view of an example feedback device;

It will be noted that throughout the appended drawings, like features are identified by like reference numerals.

DETAILED DESCRIPTION

Figure 1:
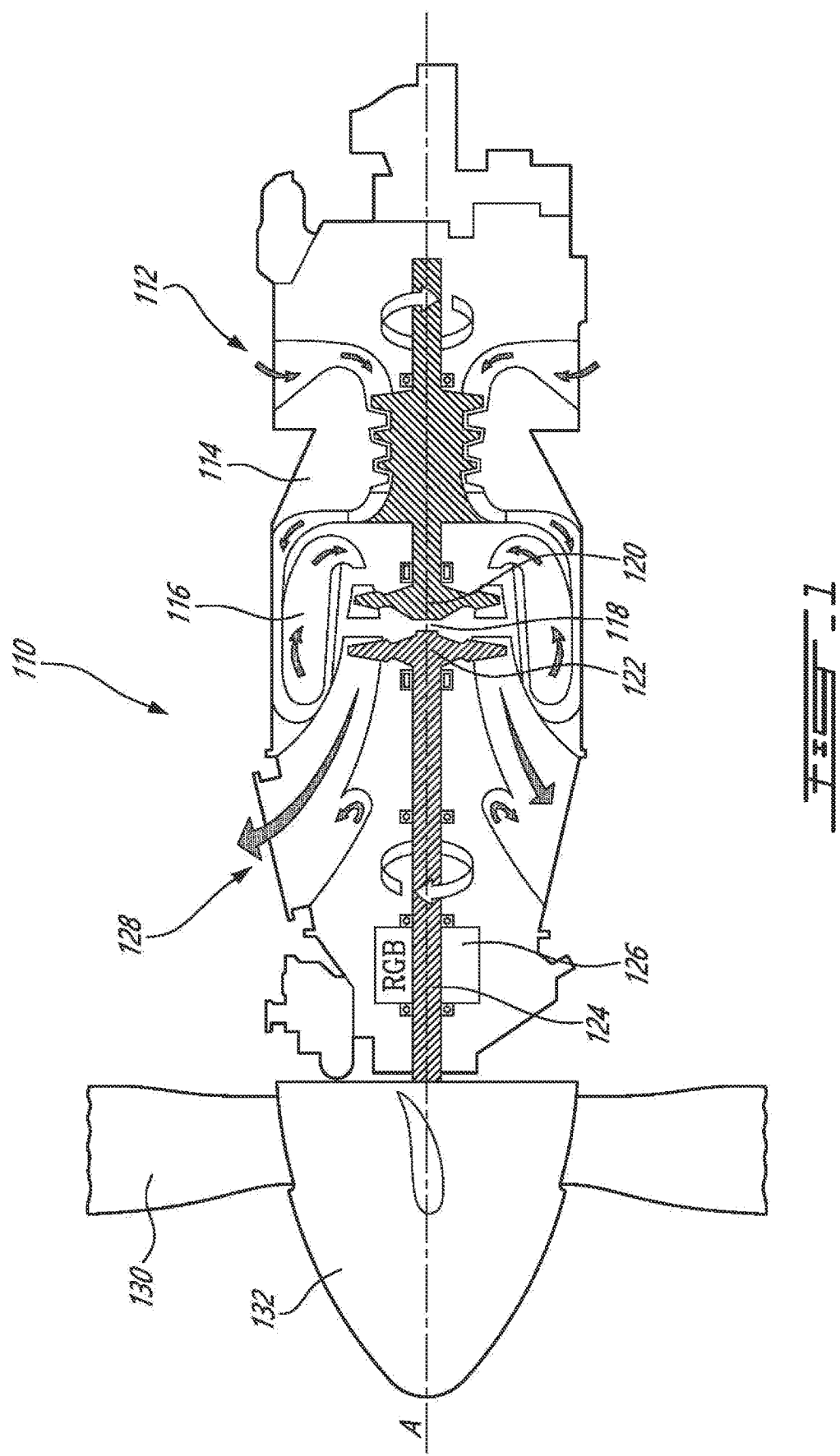
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Rotation of the output shaft 124 is facilitated by one or more bearing assemblies, which can be disposed within the RGB 126 or at any other suitable location. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Figure 2:
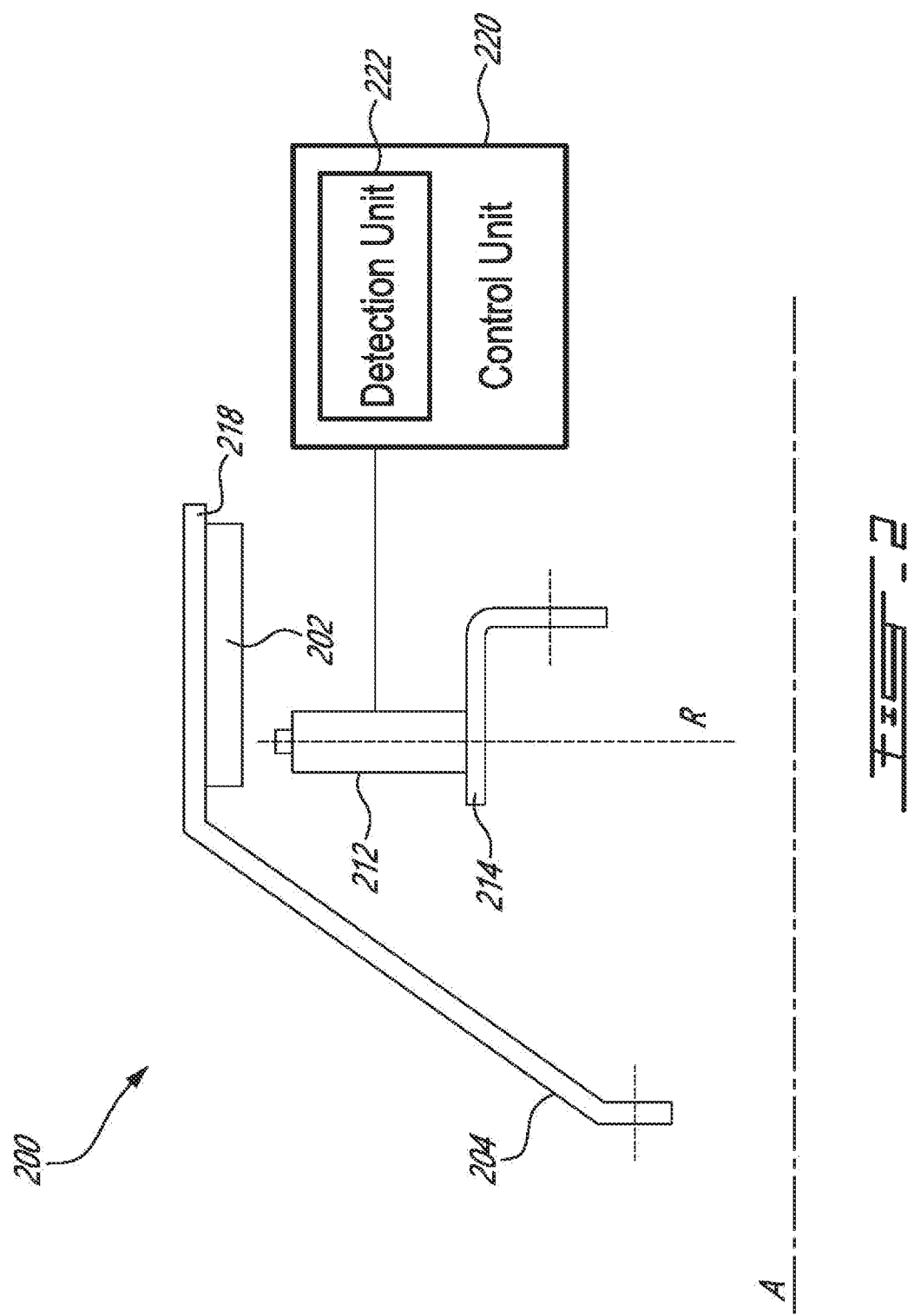
FIG. 2 is a schematic diagram of an example feedback sensing system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational speed of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric). In addition, the system 200 can be used in other feedback situations, including (but not limited to) turbine auxiliary wheels, speed target disks, speed probes for output shafts, phonic wheels, and the like.

The system 200 comprises an annular member 204 and one or more sensors 212 positioned proximate the annular member 204. Annular member 204 (referred to herein as a feedback device) has a plurality of circumferentially-spaced apart and detectable features (also referred to as position markers or teeth) 202 disposed thereon for detection by sensor(s) 212. In some embodiments, the position markers 202 and sensor(s) 212 may be disposed on a radially-outer side of feedback device 204. Alternatively, position markers 202 and sensor(s) 212 could be disposed on a radially-inner side of feedback device 204. Several position markers 202 may be spaced about the circumference (i.e., the perimeter) of the feedback device 204. The position markers 202 can be spaced equiangularly, at varying intervals, or the like. In addition, the feedback device 204 can include any suitable number of position markers 202, which can vary based on the dimensions of the feedback device 204. Other embodiments may apply.

In one embodiment, the one or more sensors 212 are fixedly mounted to a static portion of the engine 110. In other embodiments, the one or more sensors 212 are mounted for rotation with propeller 130 and to move axially with adjustment of the blade angle of the blades of the propeller 130, and the feedback device 204 is fixedly mounted to a static portion of the engine 110.

In some embodiments, the feedback device 204 is mounted for rotation with propeller 130 and to move axially along rotation axis 'A' to a plurality of axial positions, with adjustment of the blade angle of the blades of the propeller 130. An axial position of the feedback device 204 may then correspond to a respective angular (pitch) position of the blades and the position markers 202 may be useful for detecting the axial position of the feedback device 204 as the feedback device 204 and bladed rotor 130 rotate. The feedback device 204 may therefore be useful for detecting the angular position of the adjustable blades by way of correlation.

The system 200 also includes a control unit 220 communicatively coupled to the one or more sensors 212. The sensor(s) 212 are configured for producing one or more sensor signals which are transmitted to or otherwise received by the control unit 220, for example via a detection unit 222 thereof. The sensor signal can be an electrical signal, digital or analog, or any other suitable type of signal. In some embodiments, the sensor(s) 212 produce a signal pulse in response to detecting the presence of a position marker 202 in a sensing zone of the sensor 212. For example, the sensor 212 is an inductive sensor that operates on detecting changes in magnetic flux, and has a sensing zone which encompasses a circular or rectangular area or volume in front of the sensor 212. When a position marker 202 is present in the sensing zone, or passes through the zone during rotation of the feedback device 204, the magnetic flux generated by the sensor(s) 212 in the sensing zone is varied by the presence of the position marker 202, and the sensor 212 can produce a signal pulse, which forms part of the sensor signal. Accordingly, the position markers 202 may be made of any suitable material (e.g., a ferromagnetic material, Mu-Metal, or the like) which would cause the passage of the position markers 202 near the sensor 212 to provide a change in magnetic permeability within the magnetic field generated by the sensor 212.

In the example illustrated in FIG. 2, a side view of a portion of feedback device 204 and sensor 212 in accordance with at least some embodiments is shown. The sensor 212 is mounted to a flange 214 of a housing of the reduction gearbox 126, so as to be positioned adjacent the plurality of position markers 202, which extend away from the feedback device 204 and towards the sensor 212. The sensor 212 may be mounted at any suitable angle relative to the position markers 202. In some embodiments, the sensor 212 is secured to the propeller 130 so as to extend away from the flange 214 and towards the position markers 202 along a radial direction, identified in FIG. 2 as direction 'IR'. Sensor 212 and flange 214 may be fixedly mounted, for example to the housing of the reduction gearbox 126, or to any other static element of the engine 110, as appropriate.

In some embodiments, a single sensor 212 is mounted in close proximity to the feedback device 204 and the position markers 202. In some other embodiments, in order to provide redundancy as well as multiple signal sources at different axial locations, one or more additional sensors, which may be similar to the sensor 212, are provided. In particular, it may be desirable to use multiple sensors when the axial distance (i.e. the distance along axis 'A') travelled by the feedback device 204 is too large for the range of the sensors as in 212. It should be understood that any suitable number of sensors may apply and the number of sensors 212 and their positions may be optimized according to the specifics of the application.

With additional reference to FIG. 3, the feedback device 204 is a circular disk or ring-like element which rotates as part of the engine 110, for example with the propeller shaft 124 or with the propeller 130. As used herein, the term "circular disk" can refer to a an annular disk, a ring-like element, or any other suitably-shaped device. For example, the feedback device 204 can be composed of ring element 310. The ring element 310 comprises opposing faces having the edge surfaces 316, 318 and defines an outer surface 312 (sometimes referred to as a "root surface") which extends between the opposing faces and circumscribes them. Put differently, the root surface 312 of the feedback device 204 is the outer periphery of the ring element 310 which spans between the two opposing edge surfaces 316, 318 and the root surface 312 intersects the faces at the edge surfaces 316, 318. In these embodiments, the position markers 202 can take the form of projections which extend from the root surface 312.

The position markers 202 consist of a plurality of projections arranged along a direction substantially transverse to the edge surfaces 316, 318. In some embodiments, the position markers 202 are substantially equally spaced from one another on the root surface 312; alternatively, the spacing between the position markers 202 can vary. In some embodiments, the position markers 202 are integrally formed with the feedback device 204 so that the feedback device 204 may have a unitary construction. In some other embodiments, the position markers 202 are manufactured separately from the feedback device 204 and attached thereto using any suitable technique, such as welding or the like. In some embodiments, some of the position markers 202 have different circumferential thicknesses and/or chamfered edges. In some other embodiments, the longitudinal length of the position markers 202 varies from one to the next. Other embodiments are also considered. For example, in some embodiments, some of the position markers 202 are angled with respect to the edge surfaces 316, 318.

It should also be noted that, although the present disclosure discusses embodiments in which the position markers 202 are projections, other embodiments are also considered. The position markers 202 may, for example, comprise one or more of protrusions, teeth, walls, voids, recesses, and/or other singularities. For instance, in some embodiments, the position markers 202 may be embedded in the ring element 310 portion of the feedback device 204, such that the feedback device 204 has a substantially smooth or uniform root surface 312. A position marker 202 can then be a portion of the feedback device 204 which is made of a different material, or to which is applied a layer of a different material. The position markers 202 may then be applied to the root surface 312, for instance as strips of metal or other material for detection by the sensor 212, which can be an inductive sensor capable of sensing changes in magnetic flux (as discussed above) or any other suitable sensor such as a Hall sensor or a variable reluctance sensor. Still other embodiments are considered.

The signal pulses produced by the sensor 212, which form part of the electrical signal received by the control unit 220, can be used to determine various operating parameters of the engine 110 and the propeller 130. The position markers 202 can be used to determine a longitudinal position of the feedback device 204, and thereby assess the pitch angle for the propeller 130. In addition, detection of the position markers 202 can be used to determine a rotational speed of the feedback device 204, and thereby assess a rotational speed for the propeller 130.

Assessment of the longitudinal position of the feedback device 204 can be performed in various fashions. The longitudinal position of the feedback device 204 can be used as a proxy for the propeller blade pitch angle, as noted hereinabove. As the longitudinal position of the feedback device 204 changes, the sensor 212 will produce different signals. In this fashion, the signal produced by the sensor 212 can be used to determine the longitudinal position of the feedback device 204.

Assessment of the rotational speed of the feedback device 204 can be performed in various fashions. In some embodiments, a known number of the position markers 202 are of a different geometry than the remainder of the position markers 202, as illustrated in FIG. 3. The sensor 212 can detect the position markers 202 with different geometry, and based thereon can determine the rotational speed of the feedback device 204. In some other embodiments, a discontinuity is formed in the position markers 202 of the feedback device 204, for instance in the form of one or more "missing teeth". When a missing tooth passes by the sensor 212, no change in the sensor signal is produced. In this fashion, a longer-than-expected period in which no change in the sensor signal is detected can indicate the passage of the missing tooth. Repeated detections of the missing tooth can be used to assess the rotational speed of the feedback device 204. Other approaches are also considered.

With continued reference to FIG. 3, the feedback device 204 is supported for rotation with the propeller 130, which rotates about the longitudinal axis 'A'. The feedback device 204 is also supported for longitudinal sliding movement along the axis 'A', e.g. by support members, such as a series of circumferentially spaced feedback rods 306 that extend along the axis 'A'. A compression spring 308 surrounds an end portion of each rod 306.

As depicted in FIG. 3, the propeller 130 comprises a plurality of angularty arranged blades 409, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full (or maximum) reverse mode is associated with negative blade angles.

With continued reference to FIGS. 2 and 3, as the feedback device 204 rotates, varying portions thereof enter, pass through, and then exit the sensing zone of the one or more sensors 212. From the perspective of the sensor(s) 212, the feedback device 204 moves axially along axis 'A' (in the direction of arrow 'B' in FIG. 3) and rotates about direction 'F' (shown in FIG. 3). With axial travel of the feedback device 204, the one or more sensors 212 are therefore positioned adjacent to different portions of the feedback device 204. In particular, a given sensor 212 is adjacent the edge surface 318 (also referred to as the 'engine side') when the propeller is in a primary blade angle position. When the propeller 130 is in the maximum reverse condition, the sensor 212 is adjacent the edge surface 316 (also referred to as the 'propeller side'). The longitudinal (or beta) position (along axis 'A') of the feedback device 204 relative to the sensor 212 therefore varies with movement of the feedback ring 204. Other embodiments are also considered.

When the sensor 212 is positioned adjacent to the edge surfaces 316, 318 with movement of the feedback ring 204, a drop in magnetic flux detected by the sensor 212 occurs. This results in a so-called "edge-effect" that leads to an increase in reading error (also referred to herein as beta error) at the edge surfaces 316, 318, particularly as the feedback device 204 moves away from the sensor 212.

With reference to FIG. 4, there is illustrated an embodiment of a feedback device 400 which can mitigate edge-effects. The feedback device 400 is composed of a circular disk 410 which defines a root surface 412 extending between opposing faces 416, 418. Extending radially from the root surface 412 are position markers 402, which are oriented substantially parallel to a longitudinal axis of the feedback device 400, which corresponds to axis 'A' of FIGS. 1 and 2. The position markers 402 can be of any suitable length: in some cases, the position markers 402 extend beyond either or both of the faces 416, 418 of the circular disk 410; in other cases, the length of the position markers 402 is bounded by the faces 416, 418. In some embodiments, at least some of the position markers 402 are oriented at an angle relative to the longitudinal axis of the feedback device 400; that is to say, at some angle relative to the faces 416, 418. The position markers 402 define a top surface 404 which is elevated with respect to the root surface 412, and which is joined thereto via side surfaces 406, 408. The position markers 402 can have any suitable height—that is, the distance between the top surface 404 and the root surface 412—and any suitable width, which can be measured as the distance between the side surfaces 406, 408. In some embodiments, as will be discussed hereinbelow, the width of the position markers 402 can vary at different heights. In some embodiments, the width of the position markers 402 is based, at least in part, on the sizing of a probe of the sensors 212.

In order to mitigate edge-effects, the position markers 402 are provided with a particular shape, when viewed longitudinally, referred to herein as a "profile", in which a portion of the position marker 402 near the top surface 404 has a smaller width than a portion of the position markers 402 near the root surface 412. Put differently, the position markers 402 are wider near the root surface 412 and narrow toward the top surface 404. The degree to which the position markers 402 widen toward the root surface 412 can vary from one embodiment to another. In some embodiments, the profile of the position markers 402 is substantially trapezoidal, and the side surfaces 406, 408 can be substantially flat.

In some other embodiments, the profile of the position markers 402 involves one or more curves. For example, as illustrated in FIG. 4, the side surfaces 406, 408 can be concave curved surfaces extending from the flat top surface 404 and joining with the root surface 412, which follows the curve of the circular disk 410. The side surfaces 406, 408 can define circular curves, elliptical curves, parabolic curves, hyperbolic curves, or any other suitable type of curve, and can be selected to align with the curvature of the root surface 412 in any suitable fashion. The use of concave curved surfaces for the side surfaces 406, 408 can result in reduced weight for the feedback device 404 vis-à-vis trapezoidal-profiled position markers 402, which can be an important consideration in certain contexts. Additionally, as discussed hereinbelow, the curved side surfaces 406, 408 can be selected to provide a particular shape for the path of magnetic flux in the vicinity of the feedback device 400.

In another example, the side surfaces 406, 408 include one or more curved portions and one or more flat portions. For instance, the side surfaces 406, 408 can have a substantially straight portion extending downward from the top surface 402, which connects to one or more curved portions which join with the root surface 412. In a further example, the side surfaces 406, 408 can be convex curved surfaces extending from the flat top surface 404 and joining with the root surface 412, for instance forming a bulbous shape. Other embodiments are also considered, and it should be noted that the side surfaces 406, 408 need not be symmetrical.

Figure 5B:
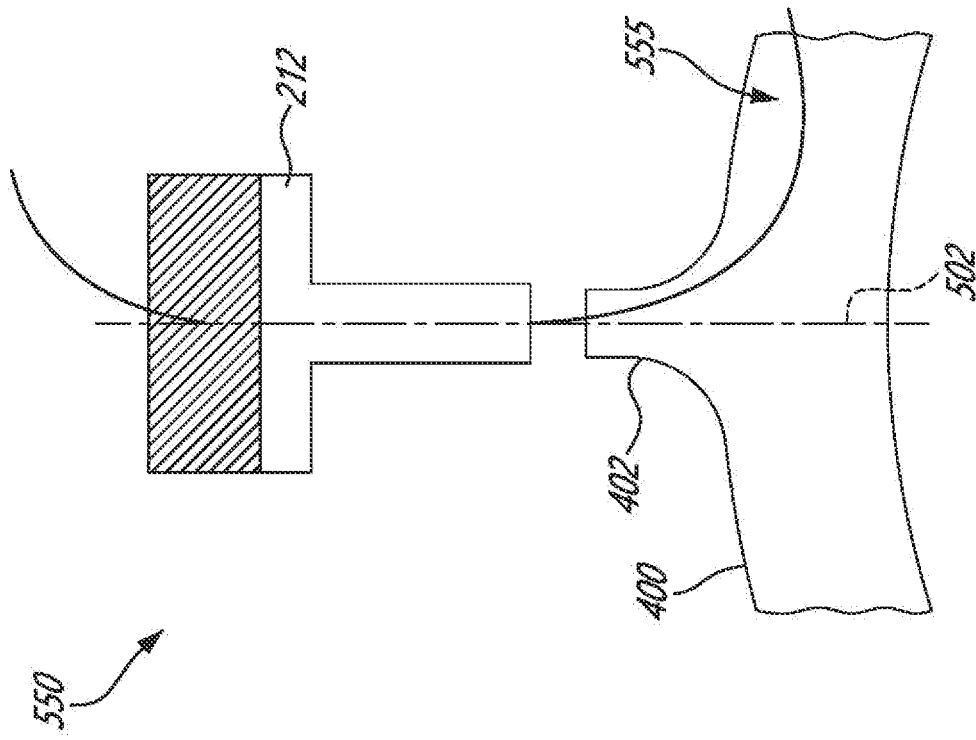
FIGS. 5A-B are side views of example feedback sensing systems in operation.
Figure 5A:
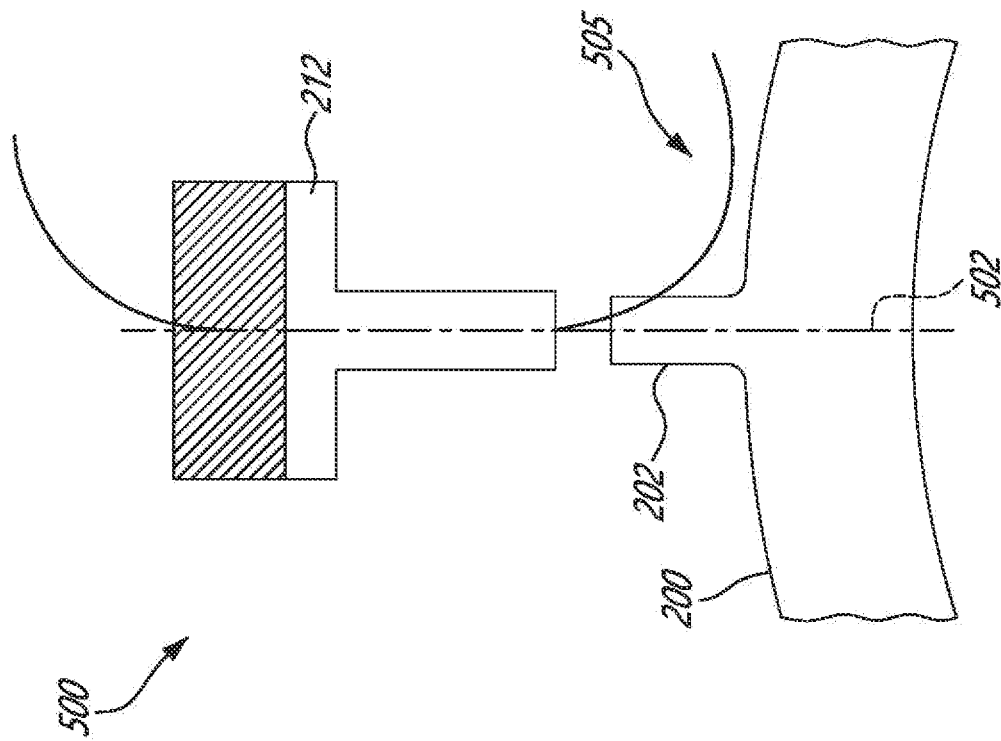

With additional reference to FIGS. 5A-B, the profile of the position markers 402, including providing the widening near the root surface 412 and, in some cases, the curved side surfaces 406, 408, can contribute to improved sensing of the position markers 402, for instance by the sensor 212. As described hereinabove, in some embodiments, the sensor 212 is an inductive sensor that detects changes in magnetic flux. As shown in FIG. 5A, when a position marker 202 of the feedback device 204 moves into the sensing zone of the sensor 212, a magnetic flux in the vicinity of the sensing system 500, illustrated by line 505, can deviate from the vertical axis 502. However, due to the profile of the position marker 202, the magnetic flux 505 can deviate only somewhat, and leak from the position marker 202. In some cases, this can result in incorrect or degraded sensing, include edge-effects and the like.

With continued reference to FIG. 5B, an alternative sensing system 550, which uses the feedback device 400, is illustrated. The magnetic flux in the vicinity of the sensing system 550, illustrated as line 555, is also caused to deviate from the vertical axis 502 by the presence of the position marker 402. However, because of the widened and curved profile of the position marker 402, the magnetic flux 555 does not leak from the position marker 402, and the change in the magnetic flux 555 may be more easily sensed by the sensor 212. In this fashion, the profile of the position markers 402 proxies a path of lower magnetic reluctance, through the position markers 402, decreasing leakage flux. It should be understood that other profiles for the position markers 402 can also result in reduced flux leakage, which in turn can lead to reduced edge effects and/or more reliable sensing, among other outcomes.

In some situations, the use of the position markers 402, having widened and/or curved profiles, can result in an increased distribution of the overall magnetic flux, which in turn can result in reduced signal strength for the sensor 212. In order to mitigate some of these effects, the use of a material, for some or all of the position markers 402, having a higher magnetic permeability (hereinafter referred to as a "high-permeability material") than the material which composes the remainder of the position markers 402 is considered.

Figure 6A:
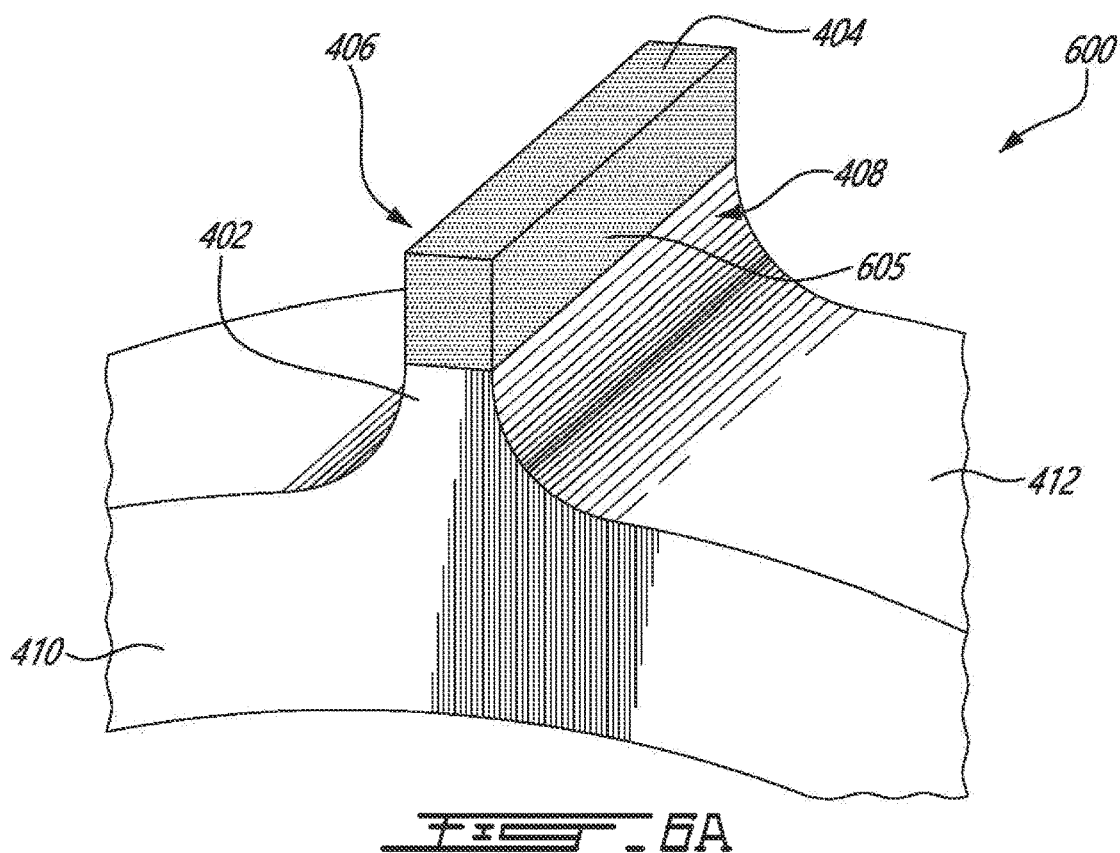
FIG. 6A-B are perspective views of additional example feedback devices.

With reference to FIG. 6A, a feedback device 600 is illustrated. The feedback device 600 is composed of the circular disk 410 and the position markers 402, which in this embodiment include a top portion 605 which is composed at least in part of the high-permeability material. The top portion 605 includes the top surface 404, and extends downward therefrom any suitable distance. In some embodiments, the top portion 605 is composed substantially entirely of the high-permeability material. In other embodiments, the top portion 605 is coated or plated with the high-permeability material, using any suitable coating, plating, or welding techniques, as appropriate. For instance, procedures such as welding, electro-forming, electro-plating, nano-crystalline coating, or the like, can be used. Additionally, traditional coating procedures are also considered. In some other instances, the high-permeability material can be provided in the form of sheet stock, plating, or the like, and be plated or welded to the position markers 402.

In some embodiments, the top portion 605 can extend downward along the side surfaces 406, 408 any suitable distance, and can follow the curvature thereof. In some other embodiments, the top portion 605 and the side surfaces 406, 408, can have different curvatures, or define a piecewise profile for the position marker 402. For instance, the top portion 605 can have sides which are substantially flat, and the side surfaces 406, 408 below the top portion 605 can be curved. Other combinations are also considered. In some further embodiments, the top portion 605 can be formed as an insert, which can be mated with the remainder of the position marker 402, for instance via welding, brazing, or the like.

Figure 6B:
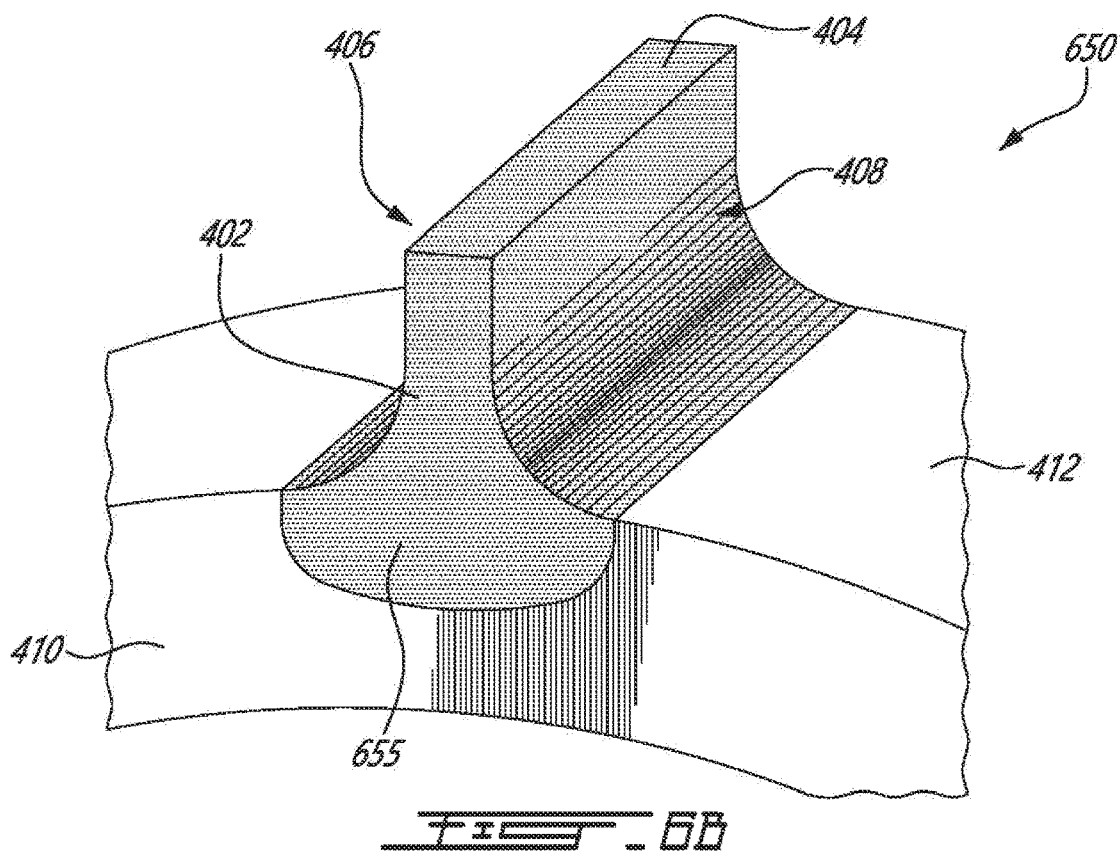

With reference to FIG. 6B, a feedback device 650 is illustrated. In this embodiment, the position markers 402 of the feedback device 650 are substantially entirely composed of the high-permeability material. In addition, the position markers 402 include a base portion 655, also composed of the high-permeability material, which extends beyond the root surface 412. The base portion 655 can be of any suitable shape and size, and can extend beyond the root surface 412 to any suitable degree. In some embodiments, as illustrated in FIG. 6B, the base portion 655 is bulb-shaped, and is, for at least some portions thereof, wider than the portions of the position marker 402 which are above the root surface 412. In other embodiments, the base portion 655 can take on other shapes and sizes, such as a dovetail configuration, or the like. The position markers 402 which include the base portion 655 can be affixed to the circular disk 410 via any suitable means, including friction, welding, and the like.

It should be understood that the foregoing discussion relating to the high-permeability material denotes a relative characteristic. In some embodiments, portions of the feedback device 400, including the circular disk 410 and/or at least part of the position markers 402, are made of a material such as steel, stainless steel, or the like, which have magnetic permeability in the range of $1.27 \times 10^{-6}$ H/m to $1.26 \times 10^{-4}$ H/m (henries per meter). In contrast, the high-permeability material, for instance Mu-metal, has a magnetic permeability in the rage of $2.5$-$6.3 \times 10^{-2}$ H/m, or other values, which may be higher or lower. It should be understood that when the term "high-permeability material" is used herein, the meaning of "high-permeability" does not necessarily denote a particular value for magnetic permeability, nor a particular range of values. Rather, references to the high-permeability material are in contrast with the material which makes up the remainder of the position markers 402 and/or the circular disk 410, which includes at least some material of a lower magnetic permeability than the "high-permeability material" which makes up the top portion 605, the base portion 655, and/or other parts of the position markers 402.

Because portions of the position markers 402 in the embodiments of FIGS. 6A-B are formed of the high-permeability material, the increased flux distribution caused by the profile of the position markers 402 can be at least somewhat mitigated, resulting in improved sensing, for instance as performed by the sensor 212. Put differently, the increased magnetic flux density provided by the presence of the high-permeability material can help to mitigate the loss in overall magnetic flux resulting from the profile of the position markers 402, and in turn help reduce the prevalence of edge-effects, for instance when the feedback device 400 is positioned so that the sensor 212 is proximate the faces 416, 418.

Figure 7:
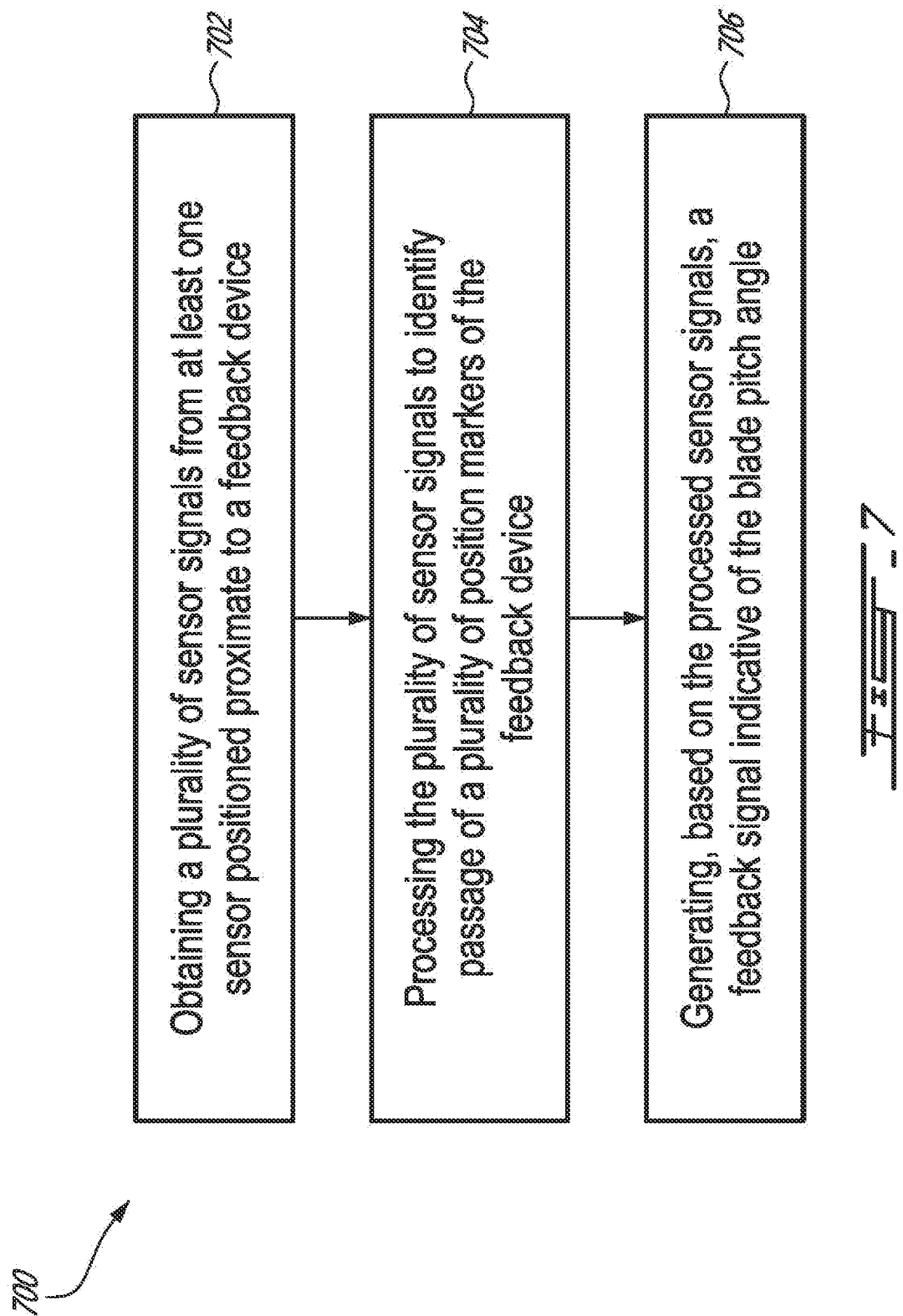
FIG. 7 is a flowchart illustrating an example method for controlling pitch for an aircraft-bladed rotor.

With reference to FIG. 7, there is illustrated a flowchart for a method 700 for controlling a pitch for an aircraft-bladed rotor, for instance the propeller 130. In some embodiments, the method 700 is performed by the detecting unit 222 and/or by the control unit 220. At step 702, a plurality of sensor signals are obtained from at least one sensor positioned proximate to a feedback device, for instance from the sensor 212 positioned proximate the feedback device 204. The feedback device 204 can be any suitable feedback device, for instance embodied as the feedback device 400, the feedback device 600, or the feedback device 650.

At step 704, the sensor signals are processed, for instance by the detecting unit 222 and/or by the control unit 220, to identify the passage of a plurality of position markers of the feedback device 400, for instance the position markers 402. The passage of the position markers 402 by the sensor 212 can be identified in a variety of fashions. In some embodiments, identification of the passage of the position markers 402 can be performed using a mark-space ratio (MSR) technique, which is described in United States Patent Application Publication No 2018/0050789 A1, which is incorporated herein by reference. For example, the MSR technique can be used to detect zero-crossings of the signals produced by the sensors 212.

At step 706, after the sensor signals are processed, a feedback signal indicative of blade pitch angle can be generated based on the processed sensor signals. The feedback signal can be any suitable type of signal, can encode information in any suitable fashion, and can be transmitted from the detecting unit 222 and/or the control unit 220 to any other suitable system, for instance an avionics system of an aircraft of which the engine 110 is a component. In some embodiments, the feedback signal can also be indicative of a rotational speed of a component with which the feedback device 400 rotates, for instance the propeller 130.

Figure 8:
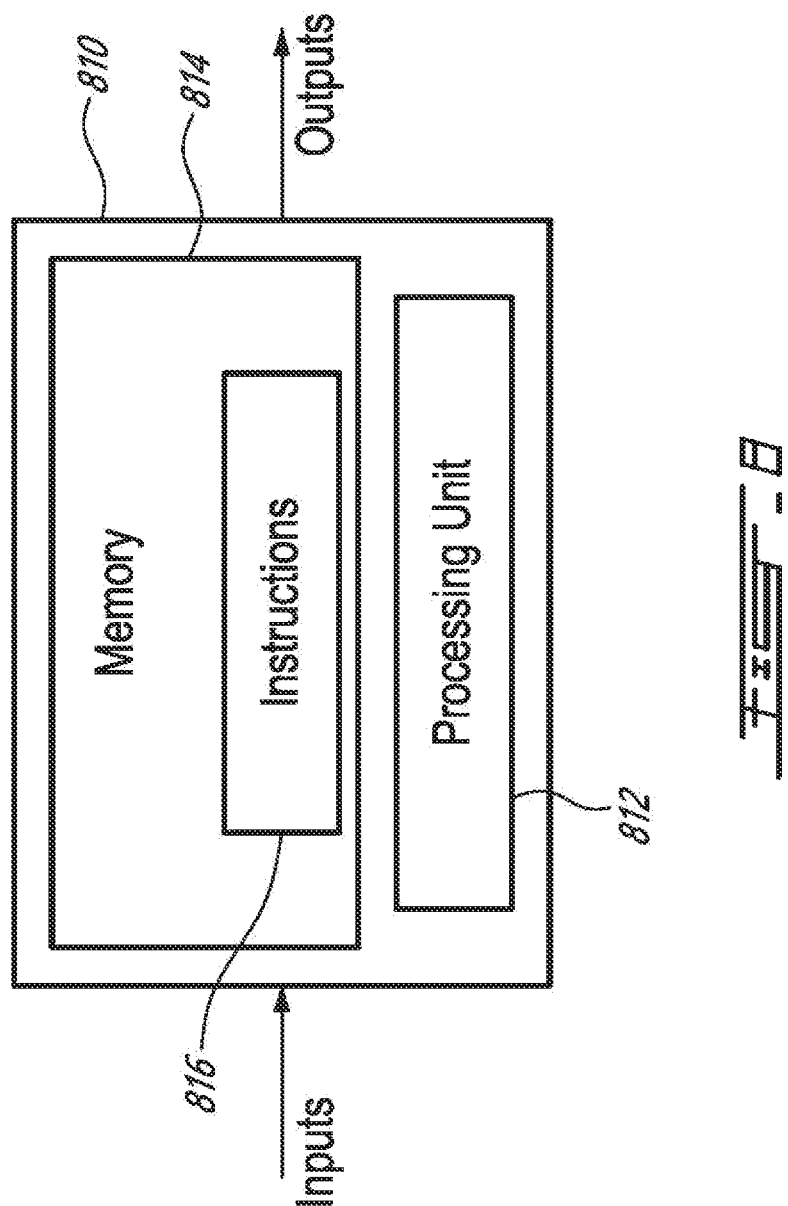
FIG. 8 is a block diagram of an example computing system for implementing the method of FIG. 7.

With reference to FIG. 8 the method 700 may be implemented using a computing device 810 comprising a processing unit 812 and a memory 814 which has stored therein computer-executable instructions 816. The processing unit 812 may comprise any suitable devices configured to implement the system such that instructions 816, when executed by the computing device 810 or other programmable apparatus, may cause the functions/acts/steps of the method 700 as described herein to be executed. The processing unit 812 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 814 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may comprise any storage means (e.g., devices) suitable for retrievably storing machine-readable instructions 816 executable by processing unit 812. In some embodiments, the computing device 810 can be implemented as part of a full-authority digital engine controls (FADEC) or other similar device, including electronic engine control (EEC), engine control unit (ECU), and the like.

The methods and systems described herein may be implemented in a high level procedural or object oriented programming or scripting language, or a combination thereof, to communicate with or assist in the operation of a computer system, for example the computing device 810. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 812 of the computing device 810, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A feedback device for use in a gas turbine engine and configured for indicating a blade pitch angle of a bladed rotor of an aircraft, the bladed rotor rotatable about a longitudinal axis of the rotor and having blades rotatable about respective spanwise axes to adjust the blade pitch angle, the feedback device comprising:
   a circular disk having first and second opposing faces and defining a root surface that extends between and circumscribes the first and second faces, the circular disk comprising a first material having a first magnetic permeability; and
   a plurality of position markers extending radially from the root surface and circumferentially spaced around the circular disk, the position markers having a top surface elevated with respect to the root surface and opposing first and second side surfaces, the side surfaces of the position markers including first and second portions extending toward the root surface, the first portion extending straight from the top surface toward the root surface and connecting to the second portion, the second portion having a curved concave profile extending toward the root surface, at least one of the position markers comprising a second material having a second magnetic permeability greater than the first magnetic permeability.

2. The feedback device of claim 1, wherein the top surface of the position markers and at least one of the first and second portions extending toward the root surface by a predetermined distance comprise the second material.

3. The feedback device of claim 2, wherein a majority of the position markers comprises the second material.

4. The feedback device of claim 2, wherein the second material comprises a sheet stock welded to the position markers.

5. The feedback device of claim 2, wherein the second material is applied as a coating on the top surfaces of the position markers.

6. The feedback device of claim 5, wherein the coating is further applied on the first and second side surfaces of the position markers.

7. The feedback device of claim 5, wherein the second material is applied using a nano-crystalline coating procedure, using an electro-plating procedure, or using a traditional coating procedure.

8. The feedback device of claim 2, wherein the position markers further comprise base portions extending beyond the root surface of the circular disk, wherein substantially the whole of the position markers, including the base portions, comprises the second material.

9. The feedback device of claim 1, wherein the curved concave profile of the second portion of the first and second side surfaces defines a circular curve.

10. The feedback device of claim 1, wherein the curved concave profile of the second portion of the first and second side surfaces defines a parabolic curve.

11. The feedback device of claim 1, wherein the plurality of position markers define a discontinuity between two adjacent ones of the plurality of position markers detectable by the at least one sensor.

12. The feedback device of claim 1, wherein the at least one position marker comprises a first plurality of position markers extending along a first direction substantially parallel to the longitudinal axis, and at least from the first face to the second face of the circular disk.

13. A feedback method for an aircraft-bladed rotor, comprising:
  obtaining a plurality of sensor signals from at least one sensor, the sensor signals produced by the at least one sensor in response to detecting passage of a plurality of position markers of a feedback device, the plurality of position markers extending radially from a root surface of a circular disk composing the feedback device, the root surface extending between and circumscribing first and second opposing faces of the circular disk, the position markers spaced circumferentially around the feedback device and having a top surface elevated with respect to the root surface and opposing first and second side surfaces, the side surfaces of the position markers including first and second portions extending toward the root surface, the first portion extending straight from the top surface toward the root surface and connecting to the second portion, the second portion having a curved concave profile extending toward to root surface, the circular disk comprising a first material having a first magnetic permeability and at least one of the position markers comprising a second material having a second magnetic permeability greater than the first magnetic permeability;
  processing the plurality of sensor signals to identify passage of the plurality of position markers of the feedback device; and
  generating, based on the processed sensor signals, a feedback signal indicative of a blade pitch angle of the rotor.

14. The method of claim 13, further comprising identifying, based on the processing of the plurality of sensor signals, a presence of coatings or plating of the second material on at least one surface of the plurality of position markers.

15. The method of claim 14, further comprising identifying, based on the processing of the plurality of sensor signals, base portions of the position markers extending beyond the root surface of the circular disk, the base portions comprising the second material.

16. The method of claim 14, wherein processing the plurality of sensor signals comprises detecting a discontinuity between two adjacent ones of the plurality of position markers.

17. The method of claim 14, wherein processing the plurality of sensor signals to identify passage of the plurality of position markers comprises determining a mark-space ratio based on the plurality of sensor signals.

18. The method of claim 14, wherein the feedback signal is further indicative of a rotational speed of the aircraft-bladed rotor.

19. A pitch control system for an aircraft-bladed rotor, comprising:
  a processing unit; and
  a non-transitory computer-readable memory communicatively coupled to the processing unit and comprising computer-readable program instructions executable by the processing unit for:
  obtaining a plurality of sensor signals from at least one sensor, the sensor signals produced by the at least one sensor in response to detecting passage of a plurality of position markers of a feedback device, the plurality of position markers extending radially from a root surface of a circular disk composing the feedback device, the root surface extending between and circumscribing first and second opposing faces of the circular disk, the position markers spaced circumferentially around the feedback device, having a top surface elevated with respect to the root surface, and having opposing first and second side surfaces, the side surfaces of the position markers including first and second portions extending toward the root surface, the first portion extending straight from the top surface toward the root surface and connecting to the second portion, the second portion having a curved concave profile extending toward to root surface, the circular disk comprising a first material having a first magnetic permeability and at least one of the position markers comprising a second material having a second magnetic permeability greater than the first magnetic permeability;
  processing the plurality of sensor signals to identify passage of the plurality of position markers of the feedback device; and
  generating, based on the processed sensor signals, a feedback signal indicative of a blade pitch angle of the rotor.

20. The feedback device of claim 12, wherein the at least one position marker comprises at least one second position marker positioned between two adjacent ones position markers of the first plurality of position markers, the at least one second position marker extending along a second direction angled relative to the first direction such that the at least one second position marker is disposed at an angle relative to the first plurality of position markers.

* * * * *